(12) United States Patent
Yi-Chang (10) Patent No.: US 6,719,010 B1
(45) Date of Patent: Apr. 13, 2004

(54) MODULAR, MULTIFUNCTIONAL WATER VALVE CONTROLLER

(76) Inventor: Chiang Yi-Chang, No. 22, Alley 21, Lane 193, Chung-Cheng N. RD., San-Chueng City, Taipei Hsien (TW)

( * ) Notice: Subject to any disclaimer, the term of this patent is extended or adjusted under 35 U.S.C. 154(b) by 0 days.

(21) Appl. No.: 10/339,334

(22) Filed: Jan. 10, 2003

(51) Int. Cl.⁷ .............................................. F16K 31/02
(52) U.S. Cl. ..................... 137/624.11; 239/69
(58) Field of Search ............ 137/624.11, 624.12, 137/624.18, 624.2; 239/69, 70

(56) References Cited

U.S. PATENT DOCUMENTS

| | | | |
|---|---|---|---|
| 4,633,905 A | * 1/1987 | Wang | 137/624.11 |
| 4,807,664 A | * 2/1989 | Wilson et al. | 137/624.11 |
| 5,826,619 A | * 10/1998 | Roman | 137/624.11 |

* cited by examiner

Primary Examiner—Kevin Lee
(74) Attorney, Agent, or Firm—Troxell Law Office PLLC (57) ABSTRACT

A modular, multifunctional water valve controller has a first housing and a second housing drawably assembled to each other. The first housing defines a batter room, and receives a driver and a valve of a control circuit therein. A water path is defined at a bottom of the first housing. The water path has an input tie-in at an end thereof, an output tie-in at an opposite end thereof, and a spherical valve on a center thereof. A motor of the driver drives decelerating gears to control start-up or stop of the spherical valve. The control circuit includes a microprocessor, a plurality of operation keys, and three types of modules in the microprocessor. The modules have interval modules, watering modules and action modules. In use, the watering time and interval time or immediate time is predetermined via operation keys and is shown by an LED module. The water valve controller of the present invention has simple type, professional type and system type. A plurality of protrusions are provided on the sides of the second housing for waterproofing, retention and recording of refreshing battery, thereby increasing the lifetime and facilitating the maintenance of the water valve controller.

9 Claims, 7 Drawing Sheets

MODULAR, MULTIFUNCTIONAL WATER VALVE CONTROLLER

BACKGROUND OF THE INVENTION

1. Field of the Invention

The present invention relates to a modular, multifunctional water valve controller, and particularly to a simple and low-cost water valve controller which easily and effectively controls valve watering interval, watering time and immediate watering time, and comprises simple type, professional type and system type, where a control circuit of the system type controls over two independent valve system.

2. Related Art

Most of conventional automobile water valve controllers open/close by mechanical time controller (or timer). Such a time controller is expensive and cost too much. Moreover, It is complicated and impractical that three mechanical timer devices, such as interval timer, watering timer and immediate watering timer, are simultaneously arranged in a valve. Meanwhile this time controller cannot simply control respective operations of over two valves, so lowering its effectiveness.

Another type of electrical timer is provided to control opening or closing of water valves. However, the electrical timer cannot control different operations such that a valve needs more than two electrical timers. The electrical timer is difficult to perform for normal users and cannot save the cost.

SUMMARY OF THE INVENTION

Accordingly, an object of the present invention is to provide an modular, multifunctional water valve controller having a specific microprocessor. The microprocessor includes a plurality of operation program modules and a plurality of timer circuits with different timing. The operation program modules comprise interval modules, watering modules and action modules. In the timer circuit, predetermined time is displayed on an LED module according to controlling and choices of operation keys. Each timer circuit has a timing point connecting with a corresponding displaying location via a lead. Each operation program module connects with a corresponding operation key via a lead. The microprocessor has an electronic input/output, respectively connecting with a motor and a control shift of a controlled device for timing and performing.

The modular, multifunctional valve controller of the present invention comprises a first housing defining a battery room and receiving a driver and a valve of a control circuit therein. A water path is provided at a bottom of the first housing. The water path has an input tie-in at an end thereof, an output tie-in at an opposite end thereof, and a spherical valve on a center thereof. A motor of the driver drives decelerating gears to control start-up or stop of the spherical valve.

The timer circuits define different time, for example, interval time: 8 minutes, 40 minutes, 2 hours, 3 hours, 8 hours, 24 hours, 4 days, 7 days etc; watering time: 4 minutes, 10 minutes, 30 minutes, 40 minutes, 70 minutes, 90 minutes; 4 hours; immediate action time: 4 minutes, 10 minutes, 30 minutes, 40 minutes, 70 minutes, 90 minutes, 4 hours. The timer circuit comprises at least interval operation, watering operation, action operation and confirmation operation, which respectively connect with corresponding operation keys. In use, watering time, interval time or immediate watering time is pre-determined and is displayed in the LED modules.

The timer circuit may further define 50%/25% of time described above to double or triple timing choices, which are shown is a table below:

| Frequency | 8 min. | 40 min. | 2 hr. | 3 hr. | 8 hr. | 24 hr. | 96 hr. | 1 week |
|---|---|---|---|---|---|---|---|---|
| 50% | 4 | 20 | 1 | 1.5 | 4 | 12 | 48 | 84 hr. |
| 25% | 2 | 10 | 30 min. | 45 min. | 2 | 6 | 24 | 27 |
| Runtime | OFF | 4 min. | 10 | 30 | 40 | 70 | 90 | 240 |
| 50% | OFF | 2 | 5 | 15 | 20 | 35 | 45 | 120 |
| 25% | OFF | 1 | 2.5 | 7.5 | 10 | 17.5 | 22.5 | 60 |
| Run (Manual) | OFF | 4 min. | 10 | 30 | 40 | 70 | 90 | 240 |
| 50% | OFF | 2 | 5 | 15 | 20 | 35 | 45 | 120 |
| 25% | OFF | 1 | 2.5 | 7.5 | 10 | 17.5 | 22.5 | 60 |

DESCRIPTION OF THE PREFERRED EMBODIMENTS

Figure 1:
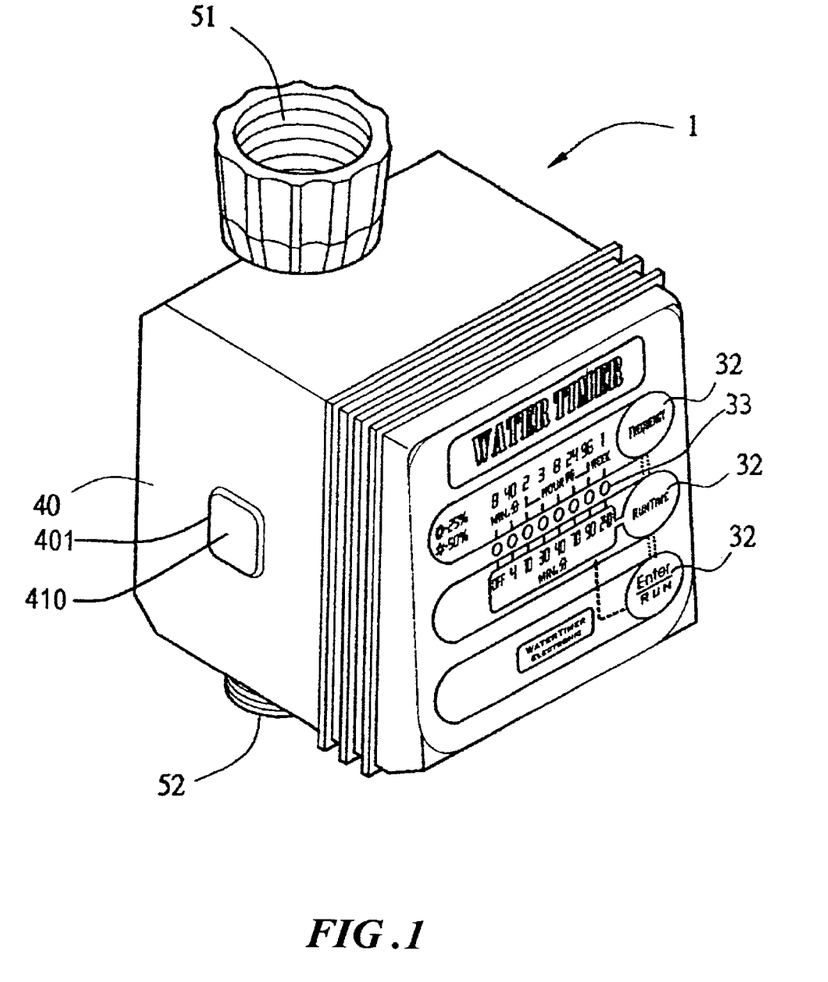
FIG. 1 is a perspective view of a water valve controller according to the present invention.
Figure 2A:
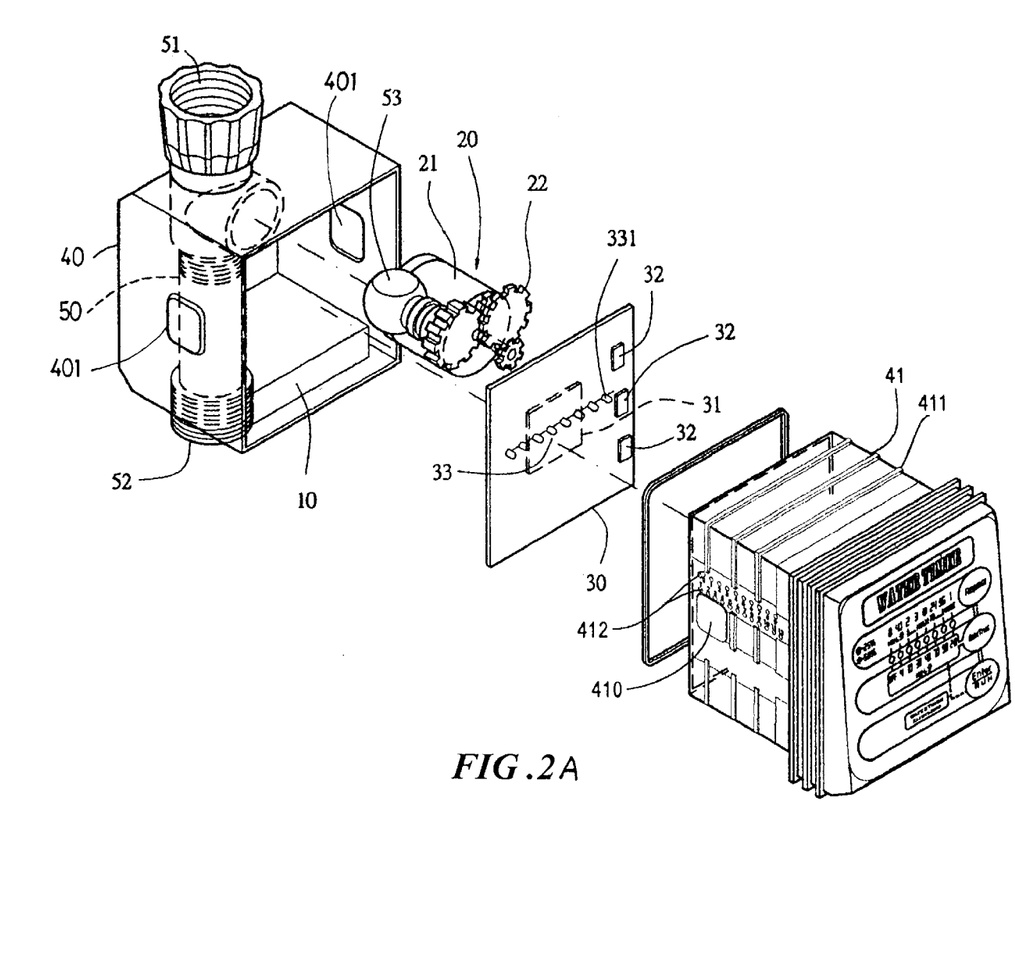
FIGS. 2A and 2B are an exploded view of the water valve controller of FIG. 1 and an exploded view of a first and a second housing from the other side of FIG. 1.
Figure 2B:
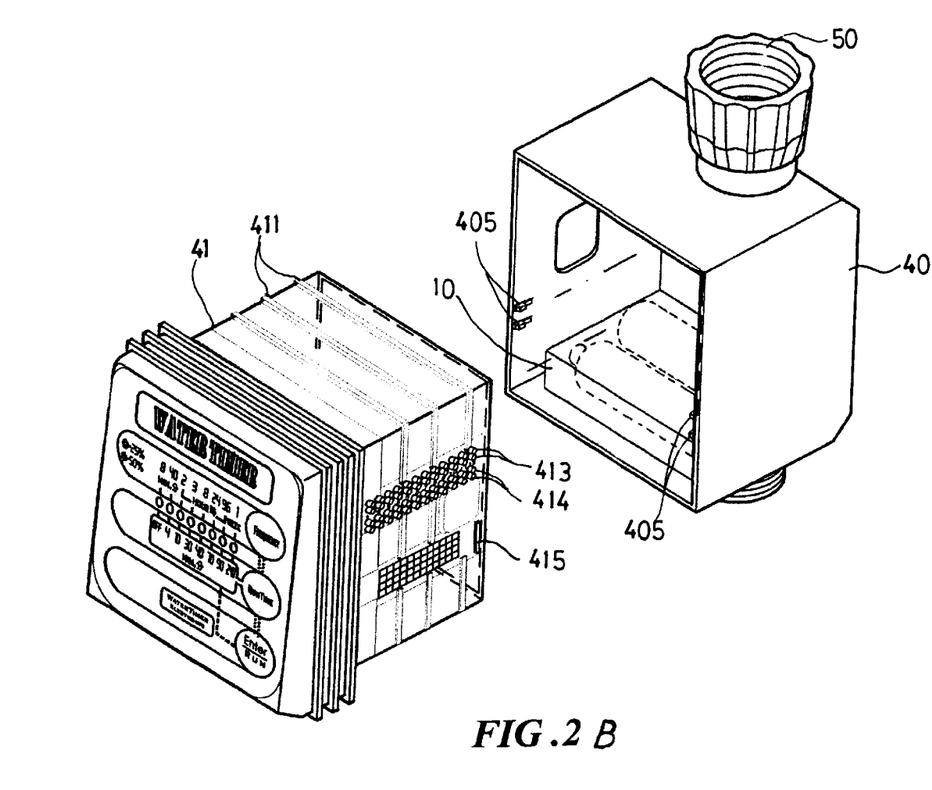

Referring to FIGS. 1–2A and 2B, a modular, multifunctional water valve controller of the present invention includes a first housing 40 and a second housing 41 drawably assembled to each other. The first housing 40 defines a hole 401, and the second housing 41 forms a tab 410 for latching the hole 401. The first housing 40 defines a battery room 10, and receives a driver 20 and a valve 1 of a control circuit 30. A water path 50 is provided at a bottom of the first housing 40. The water path 50 has an input tie-in at an end thereof, an output tie-in at an opposite end thereof, and a spherical valve 53 at a center thereof. A directing circuit motor 21 of the driver 20 drives decelerating gears 22 to control start-up or stop of the spherical valve 53. (A positioning detection jiggle switch for starting and ending points of the drive 20 is provided on a side of the last driven wheel of the decelerating gears 22, which is conventional and is not shown.) A plurality of projections 411 are provided around a periphery of the second housing 41 and are spaced a certain distance to each other for waterproofing when the second housing 41 is assembled to the first housing 40. As shown in FIG. 2B, there are two stopper 405 disposed on an edge of an opposite inner of the first housing 40 for engaging to a wall 415 which is disposed on an edge of an opposite outer of the second housing 41 after assembled and be able to prevent them separation each other. The second housing 41 forms two arrays of protrusions 412 on one side thereof, and a pair of two arrays of protrusions 413,414 on an opposite side thereof. Two arrays of protrusions 412 (Referring to FIG. 2A) on one side have an upper array and a low array. The upper array of protrusions is labeled of 0–9 to represent years, and the lower array of protrusions is labeled of 1–12 to represent months. Labels on the protrusions can be removed to refresh year and/or month. The pair of two arrays of protrusions 413,414 (Referring to FIG. 2B) on an opposite side is labeled of 1–12 to represent months. Labels of corresponding months can be removed to record the time when a battery is refreshed. The battery room 10 is enveloped when the second housing 41 is assembled to the first housing 40, while the battery room is uncovered when the second housing is drawable relative to the first housing 40. Consequently, a battery cover is omitted, thereby reducing the cost.

Figure 3:
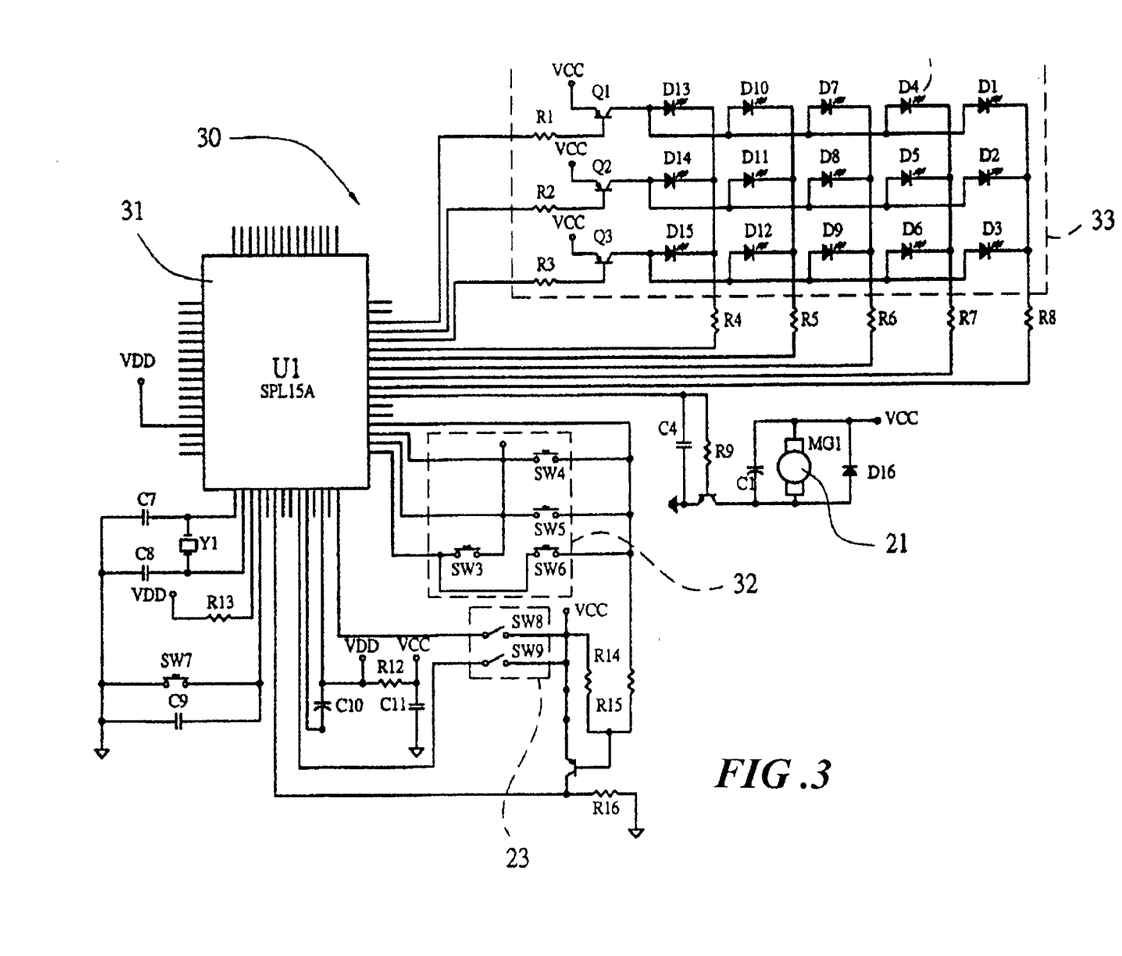
FIG. 3 is a circuit diagram of the water valve controller of FIG. 1.

The control circuit 30 includes a microprocessor 31, a plurality of operation keys 32, and defines three types of operation program modules. The operation program modules include interval modules, watering modules and action modules. As shown in FIG. 3, the microprocessor 31 controls operation programs and has a plurality of modular timer circuit (not labeled). Each timer circuit has a plurality of timing points connecting with an LED lamp 331 of an LED module. Each control circuit connects with a corresponding operation key 32 via a lead for editing and storing instructions. The microprocessor 31 further has an electronic input/output, respectively connecting with a motor 21 and a control shift 23 of a controlled device for timing and performing.

The control circuit 30 is specific for timing. The microprocessor 31 of FIG. 3 has a plurality of timer circuits (the timer circuits define different time, for example, interval time: 8 minutes, 40 minutes, 2 hours, 3 hours, 8 hours, 24 hours, 4 days, 7 days etc; watering time: 4 minutes, 10 minutes, 30 minutes, 40 minutes, 70 minutes, 90 minutes, 4 hours; immediate action time: 4 minutes, 10 minutes, 30 minutes, 40 minutes, 70 minutes, 90 minutes, 4 hours). The timer circuits control time for at least interval operation, watering operation, action operation and confirmation operation, which connect with respective operation keys 32. (In this embodiment, action operation keys and confirmation operation keys are the same operation keys. In other embodiments, action operation keys and confirmation operation keys may be different operation keys). The operation keys 32 are used to determine performance and timing, that is, the modular control circuit 30 can perform timing and controlling of different operations, thereby reducing the cost, facilitating the operations and lifting the efficiency.

Figure 4:
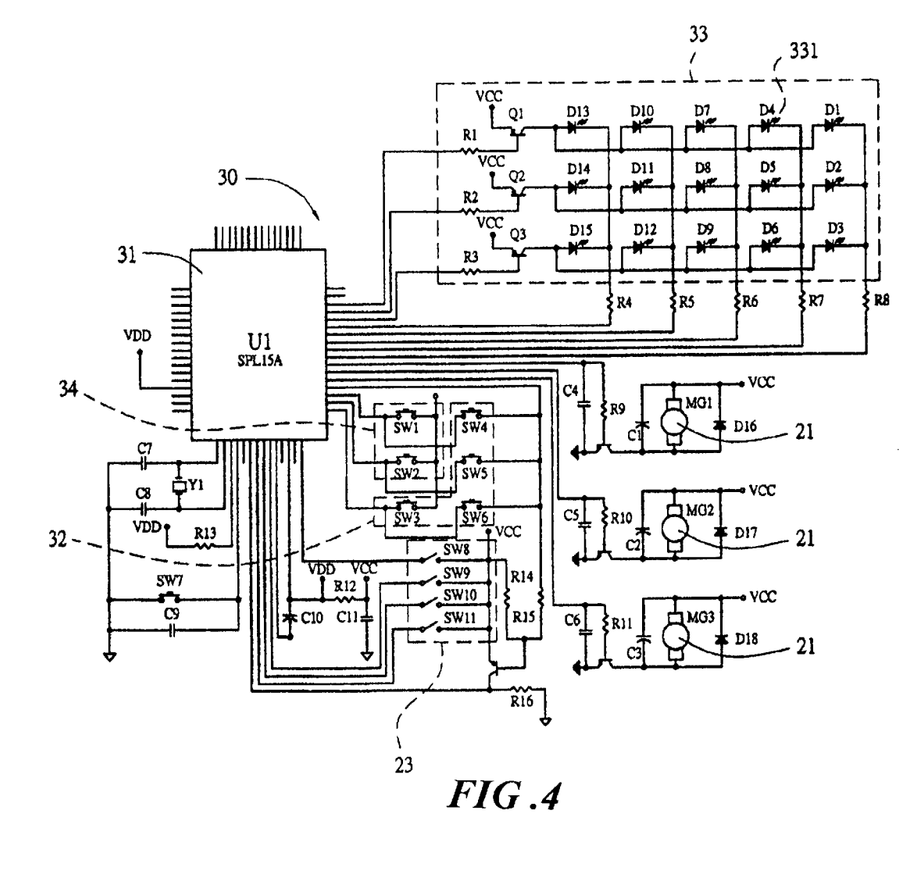
FIG. 4 is a circuit diagram of an embodiment of an operating program module of the water valve controller of FIG. 1.

The microprocessor 31 may further define 50%/25% operation program or Switch operation program, or other operation programs of specific functions, which is corresponding to an function operation key 34 (as shown in FIG. 4, two function operation keys are added to the control circuit 30 of FIG. 3). The 50%/25% operation key 34 defines ½ or ¼ of the predetermined watering time, thereby doubling or tripling choices of watering time, which is suitable for professionals. The Switch operation key 34 defines more than two groups of different controlled devices. (For example, the motor 21 of FIG. 4 controls A, B and C valve systems, respectively). In FIG. 4, a control circuit 32 of the water valve system enhances controls of the B valve system and the C valve system. The control circuit 32 of the A valve system respectively defines watering time, interval time or immediate watering time of the A, B and C valve systems. Therefore, the A, B and C valve systems can respectively perform corresponding operations with the control circuit 32, thereby reducing the number of control circuits for cost savings.

Referring to FIGS. 1 and 3, in use, three operation keys 32 are respectively defined for interval, watering and action/confirmation, which respectively define watering time, interval time or immediate time. Meanwhile the LED module 33 shows predetermined time. For instance, for watering for 30 minutes each 24 hours, an interval operation key is firstly pressed. LED lamps of the LED module 33 will shift a case to right until after 24 hours when the interval operation key is pressed a time. Then the watering operation key is pressed to choose 30 minutes (The LED 33 shows time of different operation keys). Finally, the action/confirmation operation key is pressed to define the watering time. The valve controller starts timing, and performs the predetermined operations when it is the time. This process will be circled if no change of timing.

The interval program further has a function of delay timing. That is, after defining an interval time, an action/confirmation operation key is pressed to enter a delay time program. Then the interval operation key is pressed to choose delay time. Finally, the action/confirmation operation key is pressed. For instance, predetermined time is 13 3 o'clock, but the watering operating is expected to start at 17 o'clock, where the delay of four hours is needed to meet the requirement. When defining the delay time, lighting of one LED lamp stands for one hour, and the LED lamps light in an order from left to right (or from right to left). If there are 8 lamps, 1–8 hours may be chosen when the lamps light continuously at the first circle; 9–16 hours may be chosen when the lamps flash slowly at the second circle; 17–24 hours may be chosen when the lamps flash quickly at the second circle.

When defining immediate watering for 30 minutes, the action/confirmation operation key is pressed. After 3 seconds, the action/confirmation operation key starts from a location Closing, and jumps to a location of 30 minutes. Then the operation of watering for 30 minutes is performed after lamps go out. The operation of immediate watering stops after the 30 minutes watering and restarts the predetermined automobile watering program. As described above, the performance is simple for normal users.

In addition, an LED lamp corresponding to a location of Closing flashes twice each 3 minutes when the voltage can not support the performance to remind of new battery.

Figure 5:
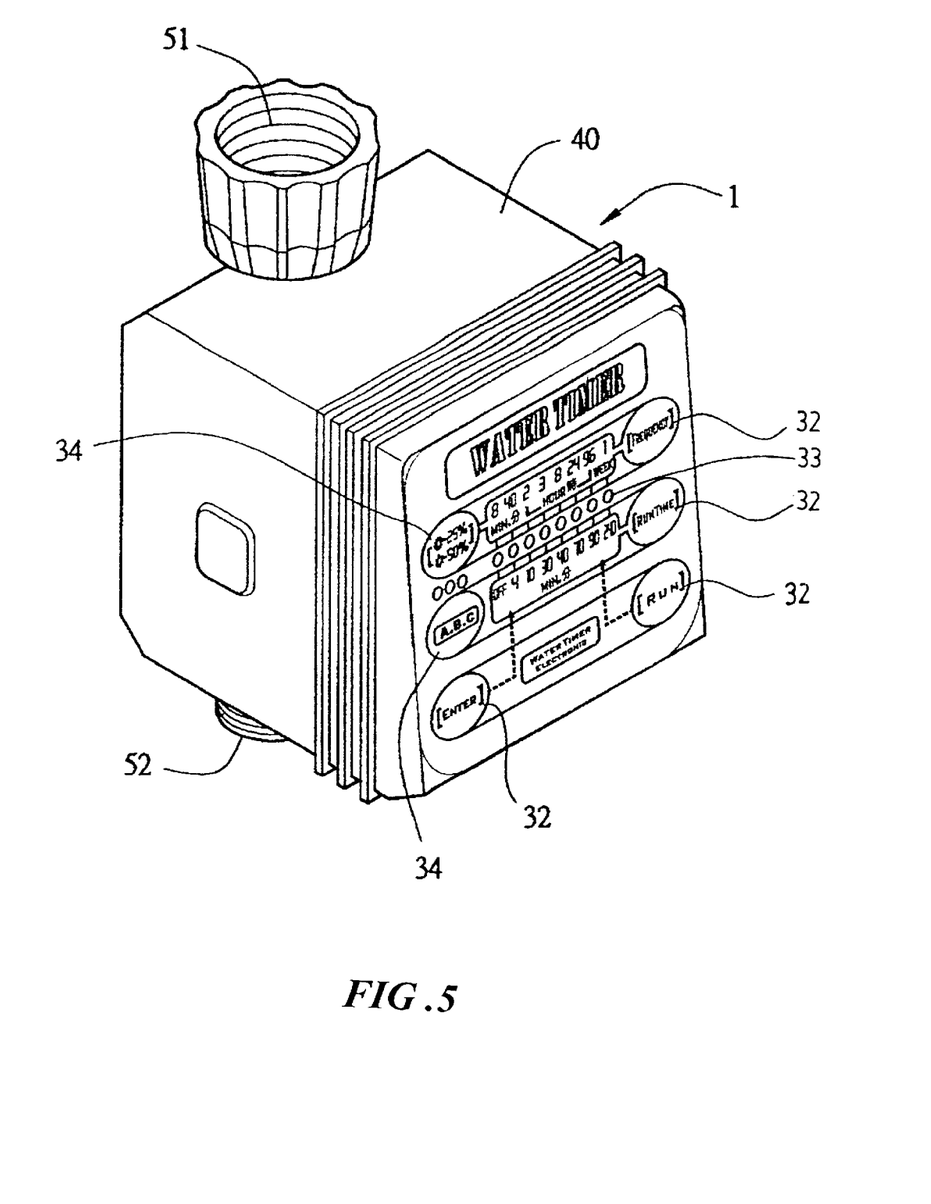
FIG. 5 is a circuit diagram of another embodiment of an operating program module of the water valve controller of FIG. 1.

Referring to FIG. 5, a 50%/25% operation key is added to a module for defining ½ or ¼ of the predetermined watering time, thereby increasing the space of predetermined time. For example, when defining watering for 7.5 minutes each 4 hours, the interval operation key is chosen to 8, and then the 50%/25% operation key is pressed to make LED slowly flash. The confirmation operation key is pressed to reduce 50% predetermined time. The interval of 4 hours is determined. The watering operation key is pressed to choose 30 minutes, and the 50%/25% operation key is pressed twice to make LED quickly flash. The confirmation operation key is pressed to reduce 75% of the predetermined time. The operation of watering for 7.5 minutes is determined. The operating programs may be predetermined according to requirements and are suitable for professionals.

A switch operation key may be added to the modules of the valve controller to control starting time and operating time of accessory controlled devices (for example, the watering valve system without control circuits). The operations are predetermined as described above to control predetermined valve system (A or B, C). Some control circuits may be omitted for cost savings. The watering operations may be performed respectively to solve voltage problems. Quantity of water may be determined according to requirements of different plants at different time.

Figure 6:
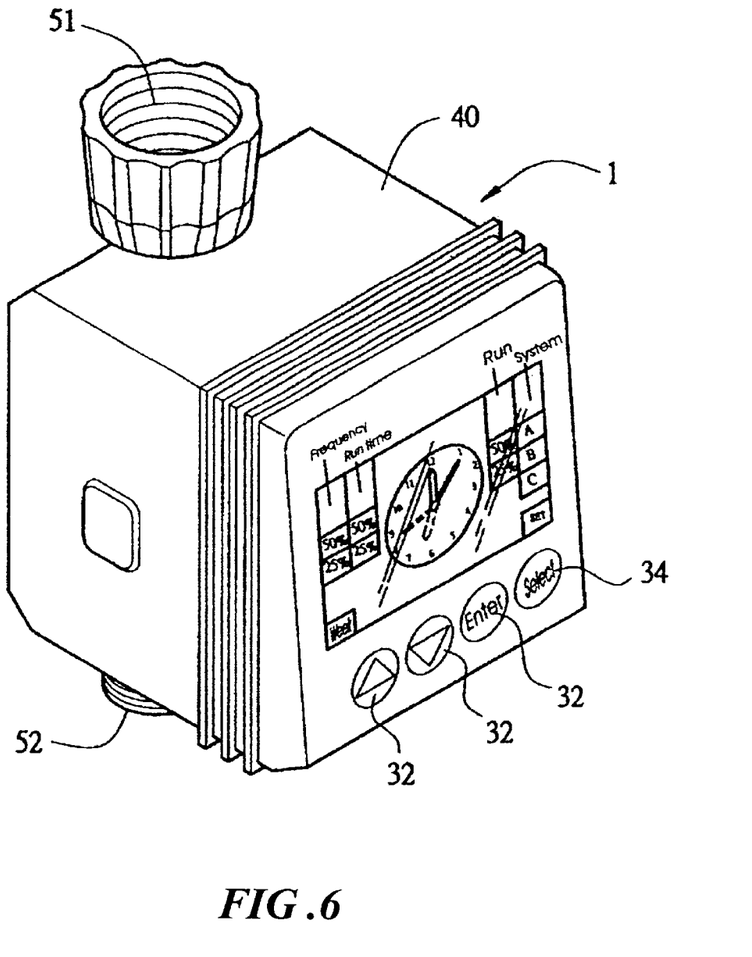
FIG. 6 is a circuit diagram of a further embodiment of an operating program module of the water valve controller of FIG. 1.

Referring to FIGS. 1, 5 and 6, the operation keys 32, the function operation keys 34 and time indication is variable. In FIG. 1, the operation keys 32 include the interval operation key, the watering operation key and the action/confirmation operation key; the LED module 33 stands in an array and in a line. In FIG. 5, the operation keys 32 include the interval operation key, the watering operation key, the action operation key, the confirmation operation key, the 50%/25% operation key and switch operation key; the LED module 33 stands in an array and in two lines. As shown in a display, 100% timing is designated as continuously lighting, 50% timing is designated as slowly flashing, and 25% timing is designated as quickly flashing. In FIG. 6, the time is shown in Liquid display page. Each operation corresponds to a clock-like display page. A next-page key and a previous-page key are provided for choosing operations, which replace of the interval operation key, the watering operation key and the action operation key. An hour hand and a minute hand are used to show the time. A page is determined to perform corresponding operation. The number of operation keys is changed, time indication may be shown with characters. All the changes belong to the spirit of the present invention.

The structure of the valve controller is so simple that it can save the cost and conveniently used. Furthermore, the valve controller is waterproofing and low power, so it has a long lifetime and is easily maintained.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A modular, multifunctional water valve controller, comprising:

a first housing and a second housing, the first housing receiving a battery room, a driver and a valve of a control circuit therein, a water path being defined at a bottom thereof, the water path has an input tie-in at an end thereof, an output tie-in at an opposite end thereof, and a spherical valve on a center thereof, a motor of the driver driving decelerating gears to control start-up or stop of the spherical valve;

wherein the control circuit includes a microprocessor, a plurality of operation keys, and three types of modules in the microprocessor, the modules including interval modules, watering modules and action modules respectively corresponding to interval operation program, watering operation program and action operation program, the microprocessor including a plurality of modular timer circuits, each timer circuit having a timing point connecting with a corresponding displaying location by a lead, each operation program connecting with a corresponding operation key by a lead, the operation programs including watering interval, watering and immediate watering, the microprocessor having an electronic input/output, respectively connecting with a motor and a control shift of a controlled device for timing and performing.

2. The modular, multifunctional water valve controller as claimed in claim 1, wherein the timer circuits further defines a 50%/25% operation program to double or triple choices of timing.

3. The modular, multifunctional water valve controller as claimed in claim 1, wherein the interval program has a function of delay timing, that is, after defining an interval time, an action/confirmation operation key is pressed to enter the delay timing program, then the interval operation key is pressed to choose delay time, and finally the action/confirmation operation key is pressed.

4. The modular, multifunctional water valve controller as claimed in claim 1, wherein a second housing is drawably assembled to the first housing, wherein a plurality of projections are provided around a periphery of the second housing and are spaced a certain distance to each other, and wherein waterproofing walls are pressed against the second housing for waterproofing when the second housing is assembled to the first housing.

5. The modular, multifunctional water valve controller as claimed in claim 1, wherein the second housing forms at least two arrays of protrusions on a side thereof, one array of protrusions being labeled of 0–9 to represent years, while the other array of protrusions being labeled of 1–12 to represent months, and labels on the protrusions being removed to refresh year and/or month.

6. The modular, multifunctional water valve controller as claimed in claim 5, wherein the second housing forms at least 4 arrays of protrusions on an opposite side thereof, the protrusion being labeled of 1–12 to represent months, and wherein labels of corresponding months can be removed to record the time when battery is refreshed.

7. The modular, multifunctional water valve controller as claimed in claim 1, wherein the operation program modules further comprise confirmation program, which corresponds to an confirmation key or combines with the action program to correspond to an action/confirmation operation key, and wherein an action/confirmation operation or an confirmation operation serves as a predetermined operation.

8. The modular, multifunctional water valve controller as claimed in claim 1, wherein the delay time is shown according to the number of LED lamps from left to right (or from right to left) and speed of lighting, for example, if one LED lamp lighting stands for one hour and there are 8 lamps, 1–8 hours may be chosen when the lamps light continuously at the first circle; 9–16 hours may be chosen when the lamps flash slowly at the second circle; 17–24 hours may be chosen when the lamps flash quickly at the second circle.

9. The modular, multifunctional water valve controller as claimed in claim 1, further comprising a stopper at least disposed on an edge of an opposite inner of the first housing for engaging to a wall which is disposed on an edge of an opposite outer of the second housing after assembled and be able to prevent them separation each other.

* * * * *